(12) United States Patent
Itonaga (10) Patent No.: US 8,546,710 B2
(45) Date of Patent: Oct. 1, 2013

(54) AUTOMATIC TRANSMISSION SWITCH

(75) Inventor: Masafumi Itonaga, Mie (JP)

(73) Assignee: Panasonic Corporation, Osaka (JP)

( * ) Notice: Subject to any disclaimer, the term of this patent is extended or adjusted under 35 U.S.C. 154(b) by 1088 days.

(21) Appl. No.: 12/018,921

(22) Filed: Jan. 24, 2008

(65) Prior Publication Data

US 2008/0210530 A1    Sep. 4, 2008

(30) Foreign Application Priority Data

Jan. 26, 2007    (JP) ................ P2007-017103

(51) Int. Cl.
 *H01H 9/06*    (2006.01)
(52) U.S. Cl.
 USPC ................ 200/61.88; 200/61.85
(58) Field of Classification Search
 USPC .......... 200/61.88, 61.89, 61.91, 61.85, 61.87, 200/11 G, 11 J, 11 K
 See application file for complete search history.

(56) References Cited

U.S. PATENT DOCUMENTS

| | | | |
|---|---|---|---|
| 5,191,178 A * | 3/1993 | Baker | 200/61.88 |
| 5,679,937 A * | 10/1997 | Iwata | 200/61.88 |
| 5,736,701 A | 4/1998 | O'Brien et al. | |
| 5,969,313 A * | 10/1999 | Ikeshima et al. | 200/61.88 |
| 6,979,788 B1 * | 12/2005 | Barbagelata et al. | 200/61.88 |
| 7,075,022 B1 * | 7/2006 | Silveria et al. | 200/61.88 |

FOREIGN PATENT DOCUMENTS

| | | |
|---|---|---|
| JP | 59-132123 | 9/1984 |
| JP | 59-149339 | 10/1984 |
| JP | 64-48818 | 3/1989 |
| JP | 2003-234048 | 8/2003 |
| JP | 2005-228910 | 8/2005 |
| JP | 2006-120343 | 5/2006 |

* cited by examiner

*Primary Examiner* — Amy Cohen Johnson
*Assistant Examiner* — Marina Fishman
(74) *Attorney, Agent, or Firm* — Greenblum & Bernstein P.L.C.

(57) ABSTRACT

An automatic transmission switch includes a fixed member provided with a fixed-side contact, and a movable member provided with a movable-side contact. The movable-side contact includes an intermittent contact portion with respect to the fixed-side contact. The contact portion extends along a moving direction of the movable member. The movable member is connected to an automatic transmission, and if the movable member is turned according to a switching operation of a shift lever, the movable member brings the fixed-side contact and the movable-side contact into contact with each other and separates them from each other. The movable-side contact is fixed to the movable member. The fixed member is provided with a coil spring which biases the fixed-side contact toward the movable-side contact.

3 Claims, 12 Drawing Sheets

AUTOMATIC TRANSMISSION SWITCH

CROSS REFERENCE TO RELATED APPLICATION

This application is based upon and claims the benefit of priority from prior Japanese Patent Application P 2007-017103, filed on Jan. 26, 2007; the entire contents of which are incorporated by reference herein.

BACKGROUND OF THE INVENTION

1. Field of the Invention

The present invention relates to an automatic transmission switch in which contacts come into contact with each other and separate from each other according to a switching operation of a shift lever of an automatic transmission.

2. Description of the Related Art

In a conventional automobile having an automatic transmission (so-called automatic car), one of a plurality of ranges can be selected by a switching operation of a shift lever. For example, the ranges are a parking range (hereinafter, P range), a reverse range (hereinafter, R range), a neutral range (hereinafter, N range), a drive range (hereinafter, D range), two-continuous range and one-continuous range (hereinafter, L range). An automobile of this kind includes an automatic transmission switch in which contacts come into contact with each other and separate from each other according to a selected range.

Figure 1:
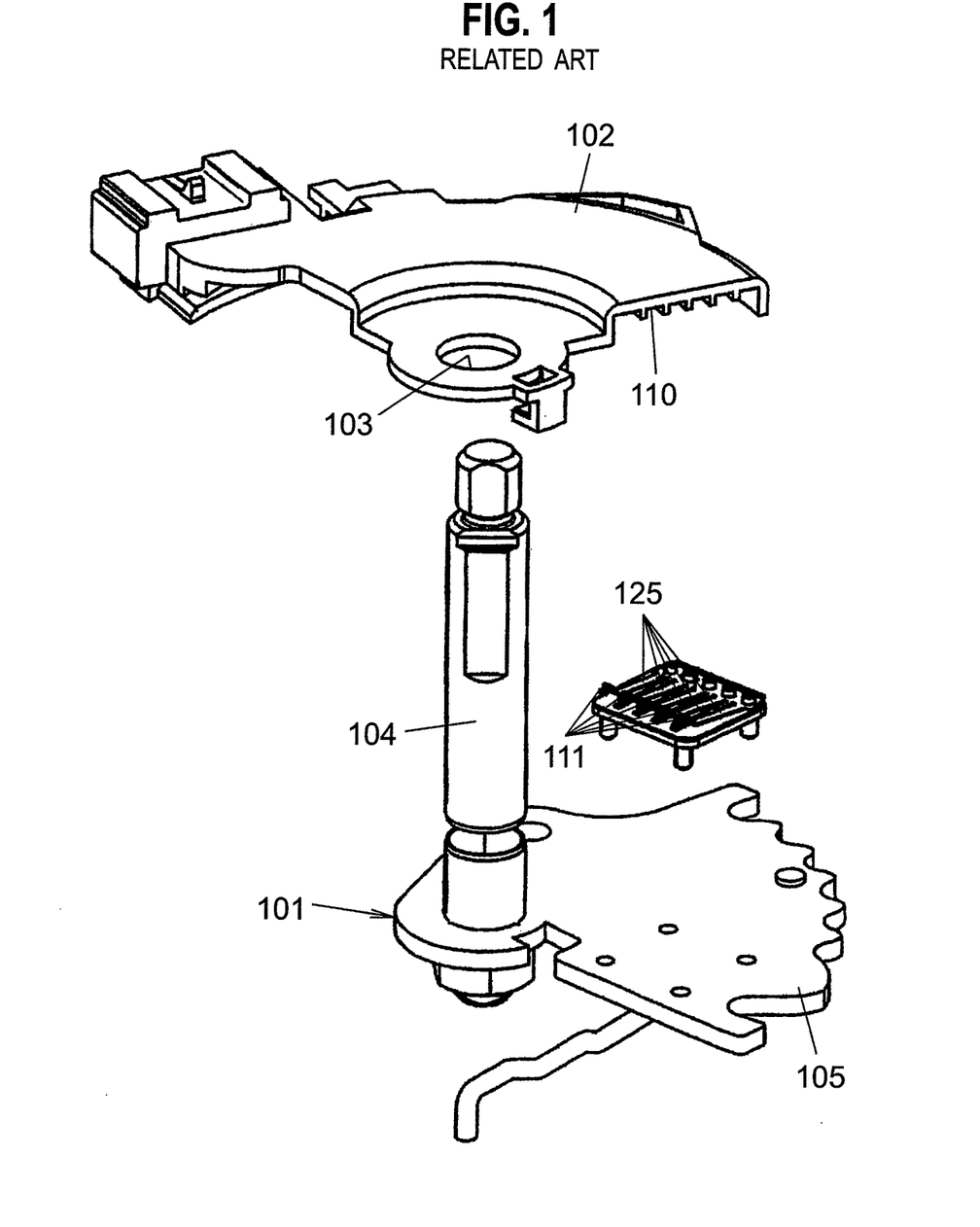
FIG. 1 is an exploded perspective view showing a conventional example.

For example, as shown in FIG. 1, an automatic transmission switch 101 includes a fixed member 102 fixed to a vehicle body (not shown) of the automobile, a shaft 104 pivotally supported by a bearing hole 103 formed in a portion of the fixed member 102, and a movable member 105 which is fixed to the shaft 104 and supported by the fixed member 102 such that the movable member 105 can turn around a center axis (turning axis) of the shaft 104 extending along a longitudinal direction of the shaft 104. The movable member 105 is connected to an automatic transmission (not shown). The shaft 104 turns in the bearing hole 103 according to a switching operation of a shift lever (not shown), and the movable member 105 turns with respect to the fixed member 102 and switches over the ranges.

Figure 2:
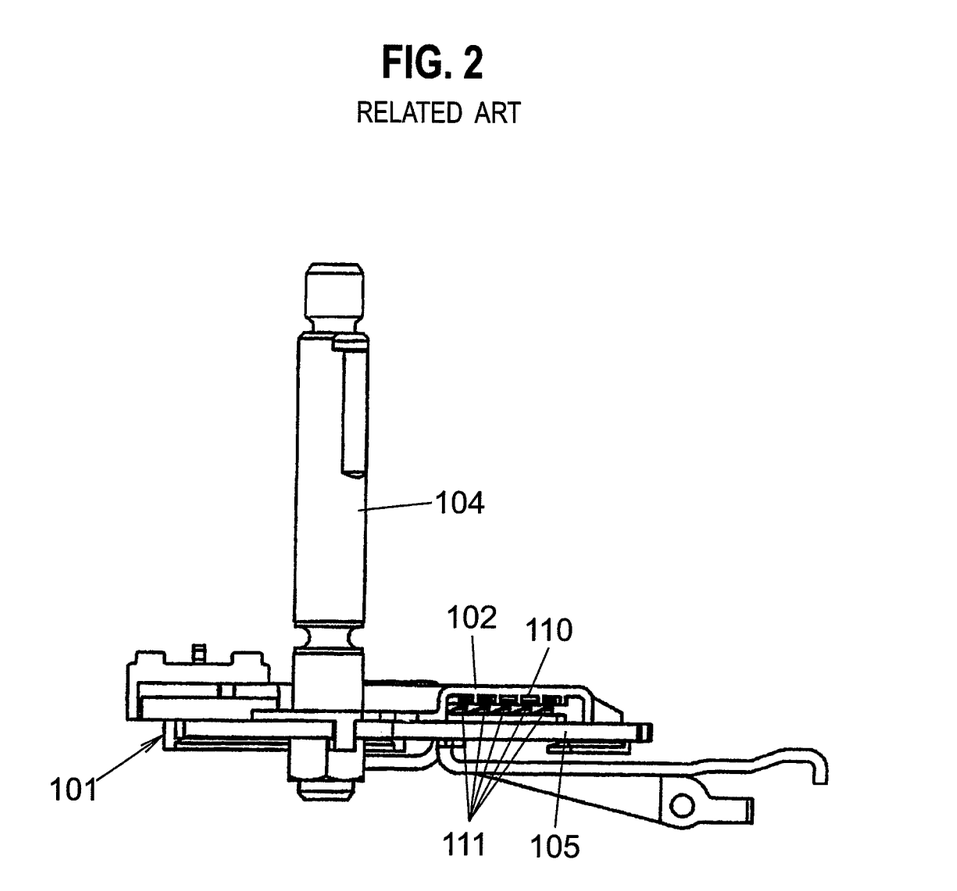
FIG. 2 is a side view of the conventional example.

As shown in FIG. 2, a fixed-side contact 110 is disposed on a surface of the fixed member 102 opposed to the movable member 105. Movable-side contacts 111 are disposed on a surface of the movable member 105 opposed to the fixed member 102. The movable-side contacts 111 come into contact with and separate from the fixed-side contact 110. The fixed-side contact 110 includes an intermittent contact portion with respect to the movable-side contacts 111. The contact portion extends in a moving direction of the movable member 105. When the movable member 105 turns according to the switching operation of the shift lever and the movable-side contacts 111 and the fixed-side contact 110 come into contact with each other and separate from each other.

In the automatic transmission switch 101 of this kind, to secure a contact pressure between the fixed-side contact 110 and the movable-side contacts 111, a spring member which biases the movable-side contact 111 toward the fixed-side contact 110 is provided in the movable member 105. In the automatic transmission switch 101 shown in FIG. 1, for example, a leaf spring 125 which biases the movable-side contacts 111 toward the fixed-side contact 110 is provided in the movable member 105 (for example, see the specification and FIG. 1 and 3 of U.S. Pat. No. 5,736,701).

Meanwhile, in the case of the automatic transmission switch 101, since the movable member 105 is connected to the automatic transmission, if the automatic transmission receives vibration from an engine during running of the vehicle and vibrates, the vibration is transmitted from the automatic transmission directly to the movable member 105. If the vibration of the automatic transmission which transmitted to the movable member 105 is propagated to the movable-side contact 111 through a spring member (the leaf spring 125), deformation of the spring member can not follow the vibration, and the movable-side contacts separate from the fixed-side contact 110 in some cases. That is, if vibration of the automatic transmission is propagated to the movable-side contacts 111 through the spring member, a so-called bounce is generated in the movable-side contacts 111 and there is a possibility that contact failure is generated between the movable-side contacts 111 and the fixed-side contact 110.

SUMMARY OF THE INVENTION

The present invention has been achieved in view of the above circumstances, and it is an object of the present invention to provide an automatic transmission switch in which a contact failure is less prone to be generated between a movable-side contact and a fixed-side contact.

A first aspect of the present invention provides an automatic transmission switch comprising a fixed member fixed to a vehicle body of an automobile, a fixed-side contact provided on one surface of the fixed member, a movable member which is opposed to the one surface of the fixed member and which is supported by the fixed member such that the movable member can turn around a turning axis perpendicular to the one surface, and a movable-side contact provided on a surface of the movable member opposed to the fixed member, in which one of the fixed-side contact and the movable-side contact has an intermittent contact portion with respect to the other along a moving direction of the movable member, and the movable member is connected to an automatic transmission and turned according to a switching operation of a shift bar so that the movable member brings the fixed-side contact and the movable-side contact into contact with each other and separates the fixed-side contact and the movable-side contact from each other, wherein the movable-side contact is fixed to the movable member, and the fixed member is provided with a spring member which biases the fixed-side contact toward the movable-side contact.

According to this structure, the movable-side contact is fixed to the movable member, and the spring member which biases the fixed-side contact toward the movable-side contact is provided in the fixed member. Therefore, even if vibration of the automatic transmission is transmitted to the movable member in a state where the movable-side contact and the fixed-side contact are in contact with each other, the movable-side contact vibrates together with the fixed-side contact, and the possibility that the movable-side contact is separated from the fixed-side contact is low. Therefore, there is an advantage that a contact failure caused by bounce of the movable-side contact is less prone to be generated as compared with the conventional structure in which vibration of the automatic transmission is propagated to the movable-side contact through the spring member. Since vibration of the automatic transmission is not propagated directly to the fixed member, vibration propagated to the fixed-side contact from the automatic transmission through the spring member is so small that the vibration can be ignored, and contact failure by the bounce of the fixed-side contact is not generated.

According to a second aspect of the present invention, in the first aspect, the movable-side contact and the movable member are integrally formed as one part.

With this structure, since the movable-side contact and the movable member are integrally formed as one part, it is possible to reduce the number of parts as compared with a case that a movable-side contact as an independent part is provided on the movable member.

According to a third aspect of the present invention, in the first or second aspect, the fixed-side contact has a contact which comes into contact with the movable-side contact, and the spring member is a coil spring interposed between the contact and the fixed member.

With this structure, since the spring member is the coil spring, it is possible to use a small spring member for absorbing vibration of the fixed-side contact which vibrates together with the movable-side contact as compared with a case that a leaf spring is used as the spring member.

According to a fourth aspect of the present invention, in any of the first to third aspects, a contact surface of the movable-side contact with respect to the fixed-side contact is a flat surface.

With this structure, since the contact surface of the movable-side contact with respect to the fixed-side contact is flat, the movable-side contact and the fixed-side contact come into face-to-face contact with each other. Therefore, when the movable member turns, a friction amount of the fixed-side contact and the movable-side contact by the spring pressure of the spring member can be reduced.

According to a fifth aspect of the present invention, in any of the first to third aspects, a portion of the movable member which comes into contact with the fixed-side contact is provided with an insulation rib made of insulation material, the insulation rib has a width smaller than that of the fixed-side contact, the insulation rib intermittently projects along the moving direction of the movable member, and a contact rib lower than the insulation rib projects from the movable-side contact at a region thereof which comes into contact with the fixed-side contact and which is not superposed on a region where the insulation rib is extended in the moving direction of the movable member.

With this structure, the contact rib projects from the portion of the movable-side contact which comes into contact with the fixed-side contact and which is not superposed on the region where the insulation rib extends in the moving direction of the movable member. Thus, even when a surface of the insulation rib is shaved when the insulation rib slides with respect to the fixed-side contact and the insulation rib adheres to the fixed-side contact as a foreign matter, the movable-side contact comes into contact with a portion of the fixed-side contact where the foreign matter does not adhere, and it is possible to avoid the contact failure.

DETAILED DESCRIPTION OF THE PREFERRED EMBODIMENTS

First Embodiment

Figure 3A:
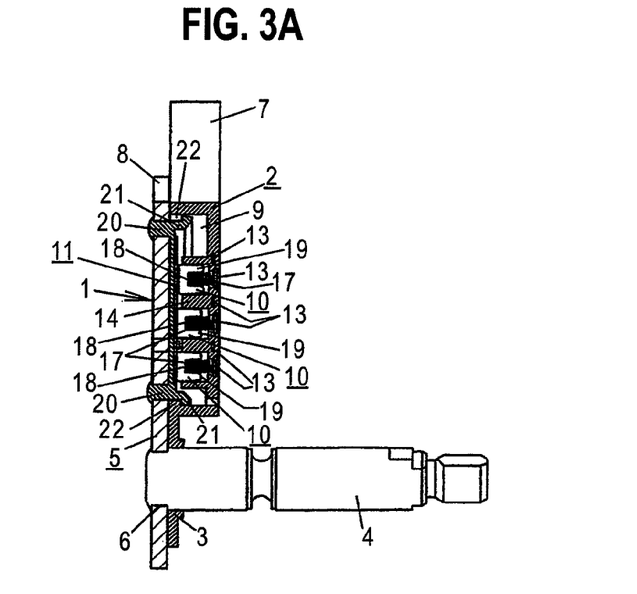
FIG. 3A is a sectional view showing a structure according to a first embodiment of the present invention.
Figure 3B:
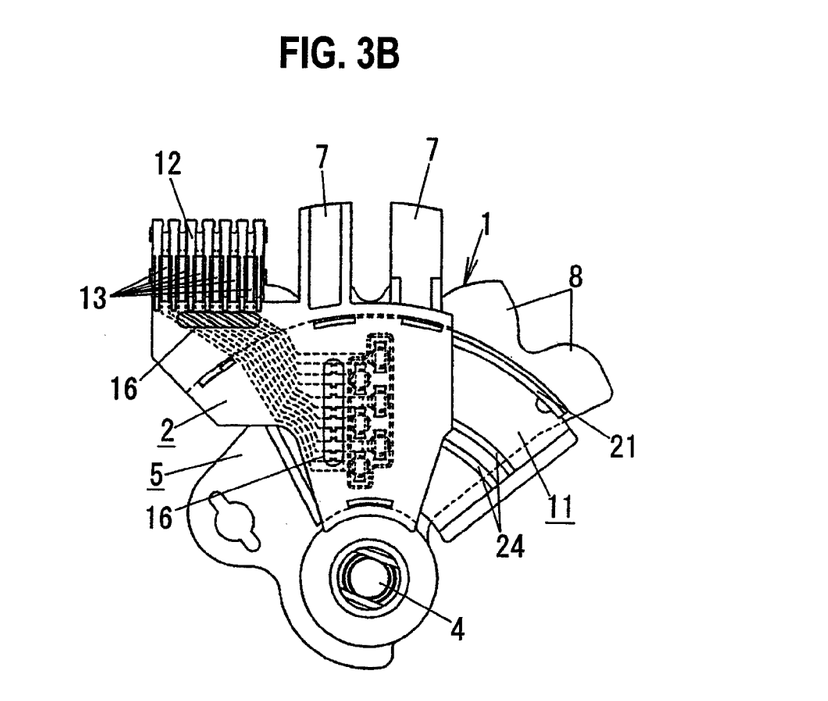
FIG. 3B is a front view showing the structure according to the first embodiment.

As shown in FIGS. 3A and 3B, an automatic transmission switch 1 according to a first embodiment of the present invention includes a fan-shaped fixed member 2 fixed to a vehicle body (not shown) of an automobile, a shaft 4 pivotally supported by a bearing hole 3 formed in a portion of the fixed member 2, and a fan-shaped movable member 5 which is fixed to the shaft 4 and which is supported by the fixed member 2 such that the movable member 5 can turn around a center axis of the shaft 4 extending along a longitudinal direction of the shaft 4. Cross sections of both ends of the shaft 4 in its longitudinal direction which intersect with each other in the longitudinal direction are rectangular in shape. One end of the shaft 4 is inserted into a rectangular fixing hole 6 (see FIG. 5A) formed in the movable member 5, thereby fixing the shaft 4 to the movable member 5.

The shaft 4 is turned in the bearing hole 3 according to a switching operation (not shown). With this structure, the movable member 5 turns with respect to the fixed member 2 according to the switching operation of the shift lever. The movable member 5 is connected to an automatic transmission (not shown) by the shaft 4, and the movable member 5 selects one of a plurality of ranges by turning the movable member 5 with respect to the fixed member 2. In the first embodiment, the ranges are six ranges, i.e., a P range, an R range, an N range, a D range, a two-continuous range and an L range for example. The automatic transmission receives vibration of an engine and the like during running of the vehicle and vibrates. Therefore, vibration is transmitted from the automatic transmission directly to the movable member 5 connected to the automatic transmission through the shaft 4 in some cases. In the fixed member 2, the shaft 4 is pivotally supported by the fixed member 2 is not fixed to the shaft 4. Thus, vibration of the automatic transmission is not transmitted directly to the fixed member 2, and the fixed member 2 is less prone to receive influence of vibration of the automatic transmission as compared with the movable member 5.

A pair of projections 7 project from an outer periphery which is adjacent to a surface of the fixed member 2 opposed to the movable member 5. A roller (not shown) which is biased by a spring (not shown) toward the bearing hole 3 is disposed between the projections 7. A plurality of plica-shaped projections 8 project from an outer periphery of the movable member 5 with which the roller slides. The plica-shaped projections 8 extend along a moving direction of the movable member 5. Distances between the plica-shaped projections 8 are set such that the ranges of the automatic transmission are switched over whenever the roller is fitted between adjacent two of the plica-shaped projections 8 when the movable member 5 is turned. With this structure, the roller is fitted between the adjacent two plica-shaped projections 8 and the movable member 5 is positioned whenever the movable member 5 turns and the ranges are switched over.

As shown in FIG. 3A, a recess 9 is formed in one surface of the fixed member 2 opposed to the movable member 5. A fixed-side contact 10 is accommodated in the recess 9. A movable-side contact 11 which comes into contact with and separates from the fixed-side contact 10 is disposed. The movable-side contact 11 comes into contact with and separates from the fixed-side contact 10 as the movable member 5 turns.

The automatic transmission switch 1 brings the fixed-side contact 10 and the movable-side contact 11 into contact with each other and separate them from each other according to the switching operation of the shift lever, and outputs a position signal indicative of a selected range to a signal circuit (not shown), thereby turning a range display lamp (not shown) ON and OFF, turning an electricity path to an engine starter (not shown) ON and OFF, and turning a backlight (not shown) ON and OFF. The electricity path to the engine starter is turned ON in the P range and N range, and the backlight is turned ON in the R range. A contact output corresponding to a contacting and separating state between the fixed-side contact 10 and the movable-side contact 11 is taken out from a connector 12 which projects from a portion of the outer periphery of the fixed member 2 opposed to the movable member 5.

Concrete structures of the fixed-side contact 10 and the movable-side contact 11 will be explained below.

Figure 4A:
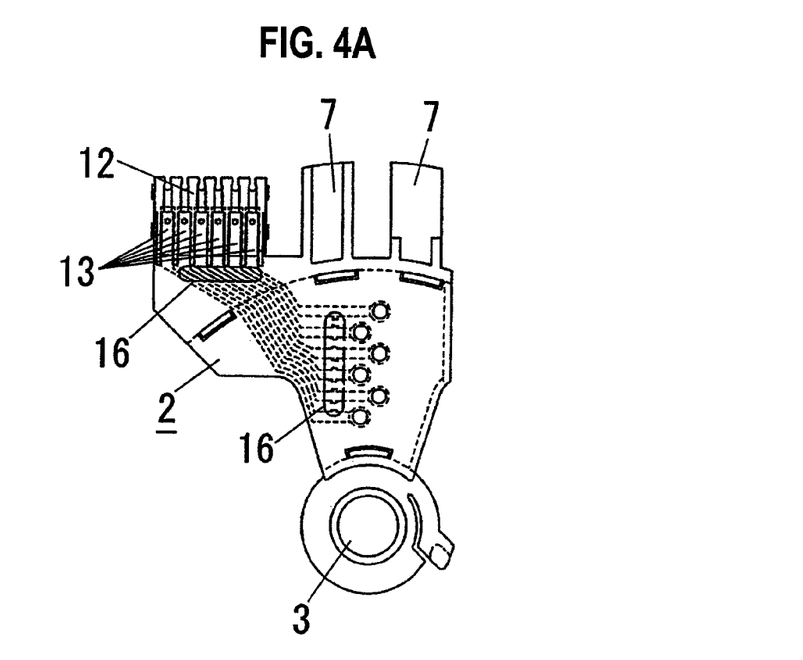
FIG. 4A is a front view showing a fixed member according to the first embodiment.
Figure 4B:
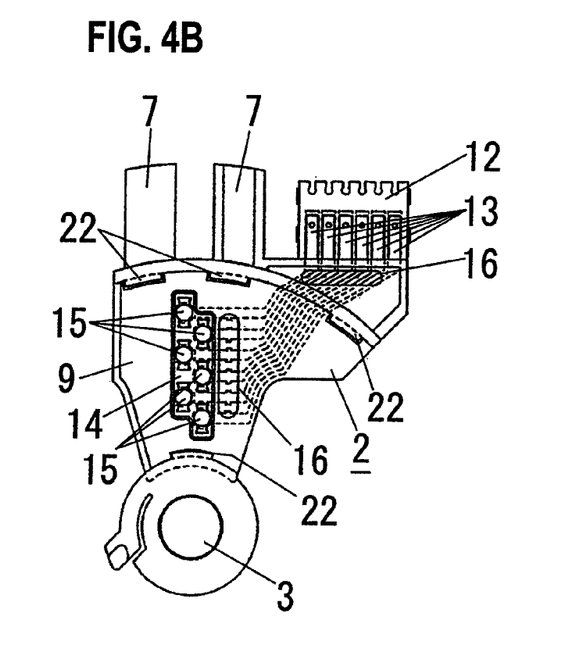
FIG. 4B is a rear view showing the fixed member according to the first embodiment.

As shown in FIG. 4A, in the fixed member 2, a plurality of (six in the first embodiment) lead frames 13 are insert-molded. One end of each of the lead frames 13 forms terminals of the connector 12 as shown in FIG. 4A. The other ends of the lead frames 13 are exposed from bottom surfaces of a plurality of (six in the first embodiment) terminal accommodating chambers 15 partitioned by a partition wall 14 standing in the recess 9 as shown in FIG. 4B. All of the lead frames 13 are coupled to each other when the fixed member 2 is molded so that the lead frames 13 are not deviation in position when the fixed member 2 is molded, connecting portions (not shown) of the lead frames 13 are cut off through cutting holes 16 formed at appropriate locations of the fixed member 2, thereby separating the lead frames 13 from each other.

As shown in FIG. 3A, a contact 19 and a coil spring 17 constituting the fixed-side contact 10 are disposed in each terminal accommodating chamber 15. Each of the fixed-side contact 10 is electrically connected to the lead frame 13 exposed from the bottom surface of the terminal accommodating chamber 15. That is, the fixed-side contact 10 is provided n each lead frame 13, and the plurality of (six in the first embodiment) fixed-side contacts 10 are provided. A cross section of the contact 19 extending along the bottom surface of the terminal accommodating chamber 15 has substantially the same shape as that of the terminal accommodating chamber 15, and a recess 18 in which one end of the coil spring 17 is accommodated is formed in a surface of the contact 19 opposed to the bottom surface of the terminal accommodating chamber 15. With this structure, the contact 19 is electrically connected to the lead frame 13 through the coil spring 17, and the contact 19 can move in a depth direction of the terminal accommodating chamber 15 while expanding and contracting the coil spring 17. The coil spring 17 functions as a spring member which biases the fixed-side contact 10 toward the outside of the terminal accommodating chamber 15.

The plurality of fixed-side contacts 10 are disposed along the radial direction of the bearing hole 3. The fixed-side contacts 10 are disposed in two lines so that the adjacent fixed-side contacts 10 are deviated from each other in the moving direction of the movable member 5. A width of the fixed-side contacts 10 extending in the radial direction of the bearing hole 3 is set greater than a pitch extending along the radial direction of the bearing hole 3. Since the adjacent fixed-side contacts 10 are deviated from each other in the moving direction of the movable member 5 as described above, the adjacent fixed-side contacts 10 do not interfere with each other.

Figure 5A:
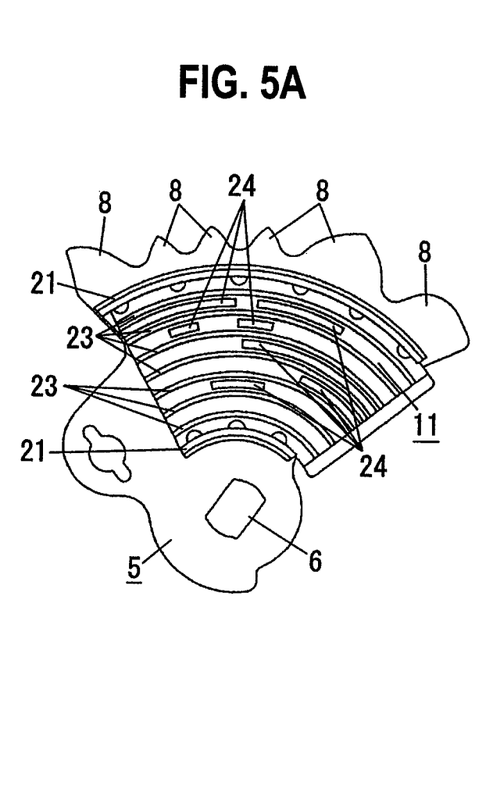
FIG. 5A is a front view showing a movable member according to the first embodiment.
Figure 5B:
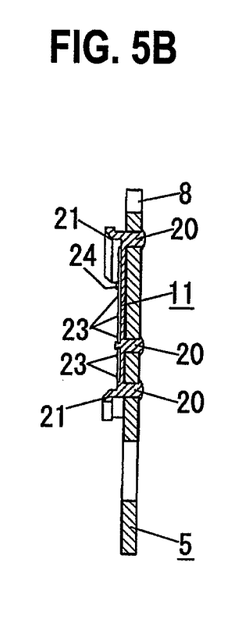
FIG. 5B is a sectional view showing the movable member according to the first embodiment.
Figure 5C:
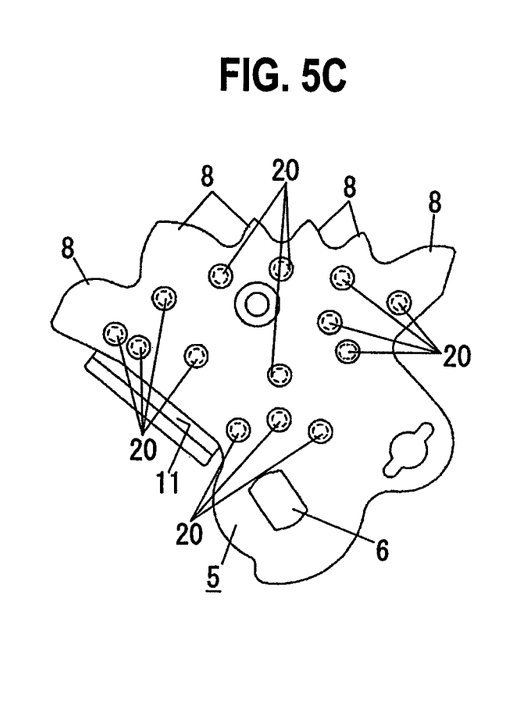
FIG. 5C is a rear view showing the movable member according to the first embodiment.

As shown in FIG. 5A, the movable-side contact 11 comprising one conductive plate is fixed to a surface of the movable member 5 opposed to the fixed member 2. As shown in FIGS. 5B and 5C, a plurality of coupling projections 20 projecting on a surface of the movable-side contact 11 opposed to the movable member 5 penetrate the movable member 5, tip ends of the coupling projections 20 are swaged, thereby positioning and fixing the movable-side contact 11 to the movable member 5. The movable-side contact 11 is formed into the fan-shape extending around the fixing hole 6, and sliding ribs 21 are formed on both end edges of the movable-side contact 11 in the radial direction. The sliding ribs 21 project toward the fixed member 2 and tip ends of the sliding ribs 21 extend in directions separating away from each other. As shown in FIG. 3A, the sliding ribs 21 are inserted into the recesses 9 of the fixed member 2, and engaged with sliding pawls 22 formed on inner surfaces of the recesses 9, and the sliding ribs 21 function to prevent the movable-side contact 11 from being pulled out from the recesses 9.

In the first embodiment, the movable-side contact 11 comprises one conductive plate. The fixed-side contacts 10 which simultaneously come into contact with the movable-side contact 11 are electrically connected to each other, and a contact output is generated in the connector 12. In the example shown in FIGS. 5A and 5B, a plurality of contact ribs 23 project from a surface of the movable-side contact 11 on the side of the fixed member 2 coaxially around the fixing hole 6. In the following description, a structure having no contact ribs 23 will be explained first and then, a structure employing the contact ribs 23 will be explained later.

A plurality of insulation ribs 24 made of insulation material are provided on a portion of the movable-side contact 11 which comes into contact with the fixed-side contacts 10. A width of the insulation rib 24 is smaller than that of the fixed-side contact 10, and the insulation ribs 24 intermittently project along the moving direction of the movable member 5. More concretely, the movable member 5 is made of synthetic resin, and the insulation ribs 24 project from the surface of the movable-side contact 11 through the through holes formed in the movable-side contact 11. The insulation ribs 24 are formed at the same pitch as that of the fixed-side contacts 10 in the radial direction of the movable-side contact 11 such that the insulation ribs 24 correspond to the fixed-side contacts 10, respectively. Therefore, if the movable member 5 is turned with respect to the fixed member 2, the fixed-side contact 10 and the movable-side contact 11 come into contact with each other when the contact 19 of the fixed-side contact 10 is in a location where the insulation ribs 24 are disconnected to each other, and the fixed-side contact 10 and the movable-side contact 11 are in out of contact with each other when the contact 19 of the fixed-side contact 10 rides on the insulation rib 24.

As shown FIG. 5A, the insulation ribs 24 are formed in a predetermined pattern such that the fixed-side contacts 10 come into contact with the movable-side contact 11 in different combinations along an arc extending around the moving direction of the movable member 5, i.e., the fixing hole 6 whenever the ranges are switched over. In short, in the state shown in FIG. 6A, for example, the second and fourth fixed-side contacts 10 as counted from the bearing hole 3 ride on the insulation ribs 24. Therefore, the first, third, fifth, and sixth fixed-side contacts 10 as counted from the bearing hole 3 come into contact with the movable-side contact 11 and the electrically conducting state is established.

Figure 6A:
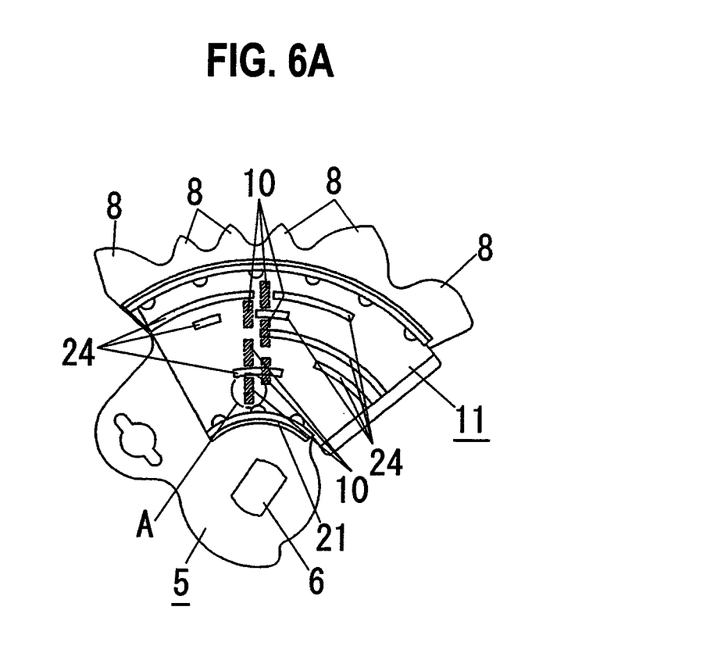
FIG. 6A is a front view showing a contacting state between a movable-side contact and a fixed-side contact of the first embodiment.
Figure 6B:
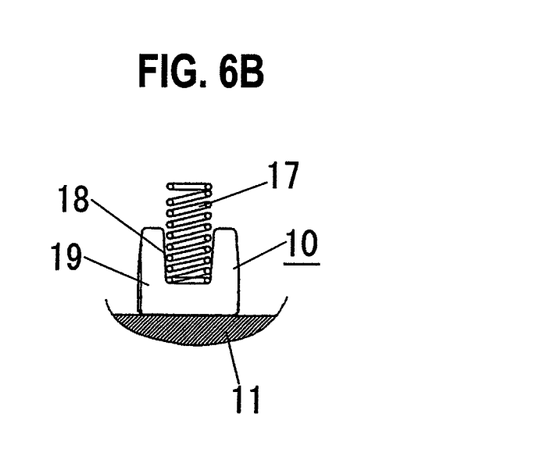
FIG. 6B is a sectional view of a portion A in FIG. 6A.

In the example shown in FIG. 6A, the movable-side contact 11 is not provided with the contact ribs 23, and the contact surface of the movable-side contact 11 with respect to the fixed-side contact 10 is flat. Therefore, since the movable-side contact 11 and the fixed-side contact 10 come into face-to-face contact with each other as shown in FIG. 6B, the spring pressure of the coil spring 17 which pushes the fixed-side contact 10 is dispersed to the entire region of the contact surface of the fixed-side contact 10 with respect to the movable-side contact 11. Thus, there is an advantage that the wearing amounts of the fixed-side contact 10 and the movable-side contact 11 caused by the spring pressure of the coil spring 17 when the movable member 5 is turned can be reduced.

In the automatic transmission switch 1 according to the first embodiment, the movable-side contact 11 is fixed to the movable member 5, and the fixed member 2 is provided with the spring member (the coil spring 17) which biases the fixed-side contact 10 toward the movable-side contact 11. Therefore, even when vibration is transmitted from the automatic transmission connected to the movable member 5 directly to the movable member 5 in a state where the movable-side contact 11 and the fixed-side contact 10 are in contact with each other, the movable-side contact 11 and the fixed-side contact 10 vibrate together. Therefore, the possibility that the movable-side contact 11 is separated from the fixed-side contact 10 is low.

Therefore, the first embodiment has an advantage that a contact failure by bounce of the movable-side contact 11 is less prone to be generated as compared with the conventional structure in which vibration which is transmitted to the movable member from the automatic transmission is transmitted to the movable-side contact through a spring member. Since vibration of the automatic transmission is not transmitted directly to the fixed member 2, vibration propagated from the automatic transmission to the fixed-side contact 10 through the coil spring 17 is so small that it can be ignored, and a contact failure by the bound of the fixed-side contact 10 is not generated.

In the first embodiment, since the spring member is the coil spring 17, the spring member for absorbing vibration of the fixed-side contact 10 which vibrates together with the movable-side contact 11 can be made small as compared with a case that a leaf spring is used as the spring member. The one end of the coil spring 17 according to the first embodiment is inserted into the recess 18 formed in the fixed-side contact 10 and the other end is in contact with the lead frame 13. Therefore, both ends of the coil spring 17 are not fixed to the fixed-side contact 10 or fixed member 2. Thus, the coil spring 17 easily moves between the fixed member 2 and the fixed-side contact 10 as compared with a case that a spring member whose end is fixed to the fixed-side contact 10 or the fixed member 2 is used. Thus, even if vibration is transmitted to the fixed member 2, the fixed-side contact 10 is less prone to receive the vibration.

Figure 7A:
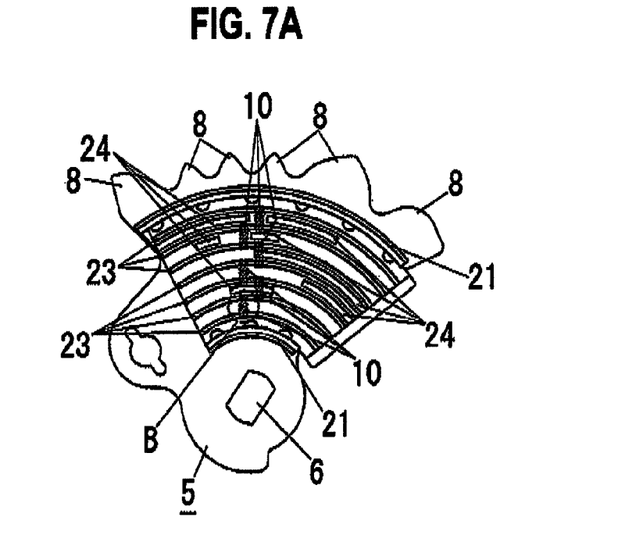
FIG. 7A is a front view showing a contacting state between a movable-side contact and a fixed-side contact of another structure according to the first embodiment.

Next, as shown in FIG. 7A, a structure in which the movable-side contact 11 provided with the contact ribs 23 will be explained. In FIG. 7A, the contact ribs 23 are provided at portions of the movable-side contact 11 which come into contact with the fixed-side contact 10 and portions thereof on both sides in the width direction of the insulation ribs 24. Therefore, the contact ribs 23 are not superposed on a region where the insulation ribs 24 extend in the moving direction of the movable member 5. The contact ribs 23 are extended between both ends of the movable-side contact 11 in the moving direction of the movable member 5, and heights of the contact ribs 23 are lower than the insulation ribs 24, as shown in FIG. 7C.

Figure 7B:
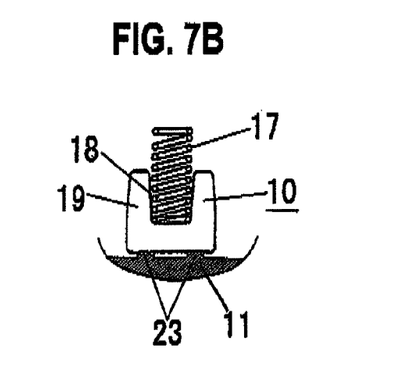
FIG. 7B is a sectional view of a portion B in FIG. 7A.
Figure 7C:
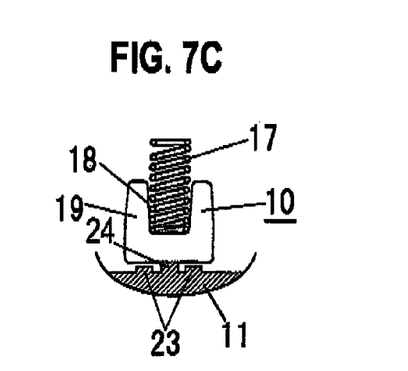
FIG. 7C is a sectional view of a portion including an insulation rib in FIG. 7.

According to this structure, as shown in FIG. 7B, the movable-side contact 11 comes into contact with the fixed-side contact 10 by bringing the tip ends of the pair of contact ribs 23 into contact with the fixed-side contact 10. The fixed-side contact 10 comes into contact with the adjacent pair of contact ribs 23 astride the contact ribs 23. If the movable member 5 turns and the fixed-side contact 10 rides on the insulation rib 24, the contact ribs 23 are separated from the fixed-side contact 10 and the fixed-side contact 10 and the movable-side contact 11 come out from the contacting state.

A surface of the insulation rib 24 made of synthetic resin is shaved when the insulation rib 24 slides on the fixed-side contact 10 and a fixed member adheres to the fixed-side contact 10 in some cases. In such a case, the fixed member adheres to a contact portion of the fixed-side contact 10 with respect to the insulation rib 24. In the case of the structure shown in FIGS. 7A and 7B, the fixed-side contact 10 comes into contact with the movable-side contact 11 through the contact ribs 23 on both sides of the contact portion with respect to the insulation rib 24. Therefore, the movable-side contact 11 comes into contact with the fixed-side contact 10 while avoiding a portion of the fixed-side contact 10 to which the fixed member adheres. Thus, a contact failure which may be caused when a fixed member is interposed between the fixed-side contact 10 and the movable-side contact 11 can be avoided.

In the first embodiment, the movable-side contact 11 comprises the one conductive plate, but a plurality of electrically independent movable-side contacts 11 may be constituted by fixing a plurality of conductive members constituting the movable-side contact 11 to the movable member 5.

Second Embodiment

Figure 8A:
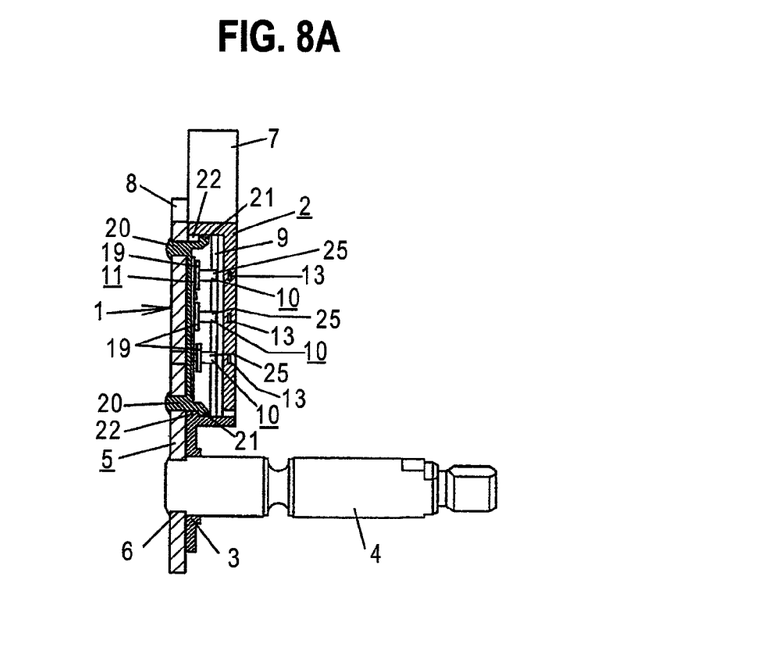
FIG. 8A is a sectional view showing a structure according to a second embodiment of the present invention.
Figure 8B:
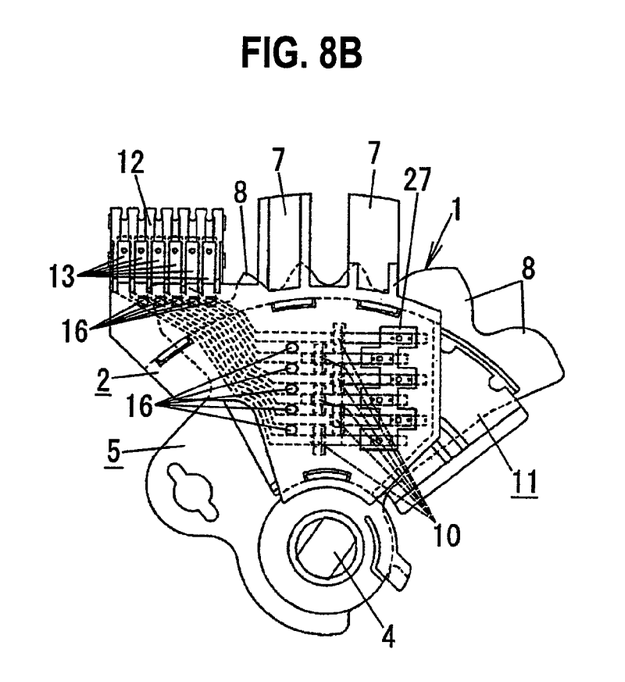
FIG. 8B is a front view showing the structure according to the second embodiment.

As shown in FIGS. 8A and 8B, an automatic transmission switch 1 according to the second embodiment of the present invention is different from the automatic transmission switch 1 according to the first embodiment in that a leaf spring 25 is used as the spring member which biases the fixed-side contact 10 toward the movable-side contact 11 instead of the coil spring 17. Other structures and functions are the same as those of the first embodiment.

Figure 9A:
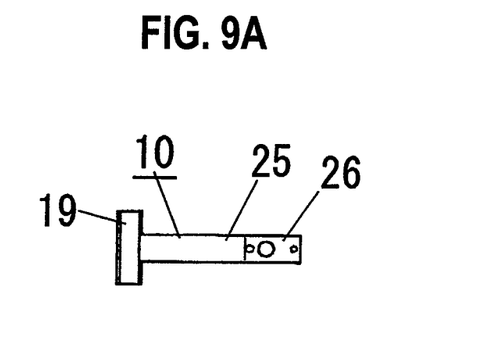
FIG. 9A is a front view showing a structure of a fixed-side terminal according to the second embodiment.
Figure 9B:
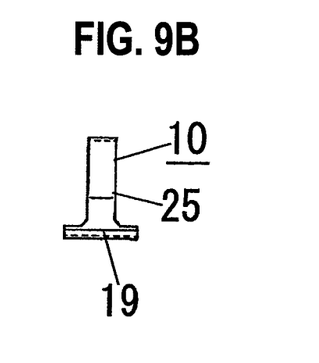
FIG. 9B is a side view showing the structure of the fixed-side terminal according to the second embodiment.
Figure 9C:
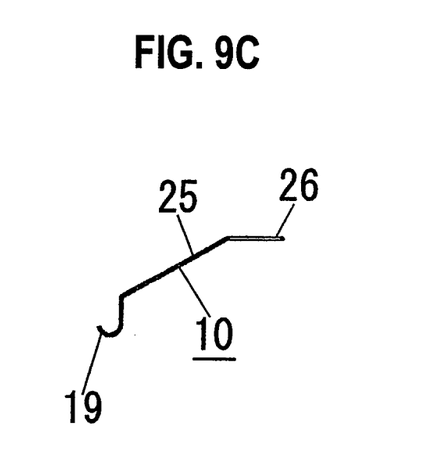
FIG. 9C is a bottom view showing the structure of the fixed-side terminal according to the second embodiment.
Figure 10A:
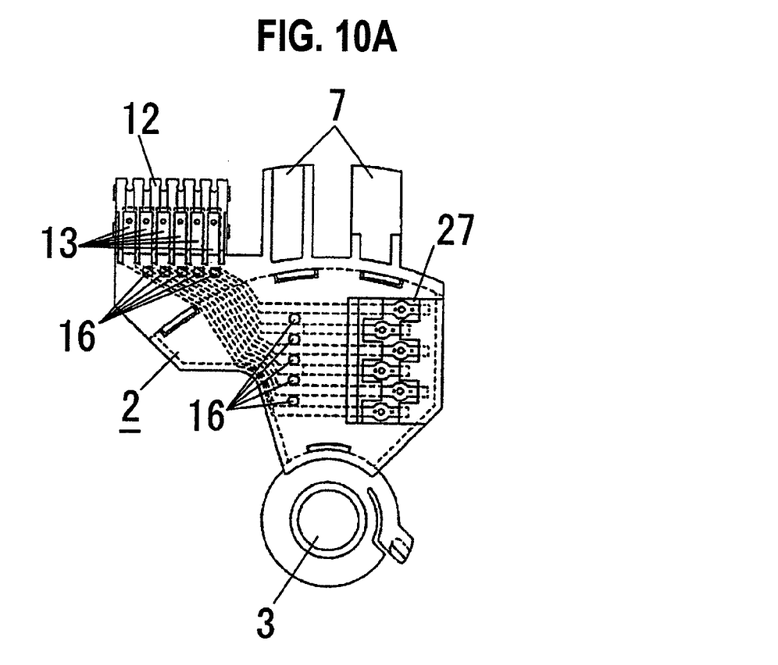
FIG. 10A is a front view of a fixed member according to the second embodiment.
Figure 10B:
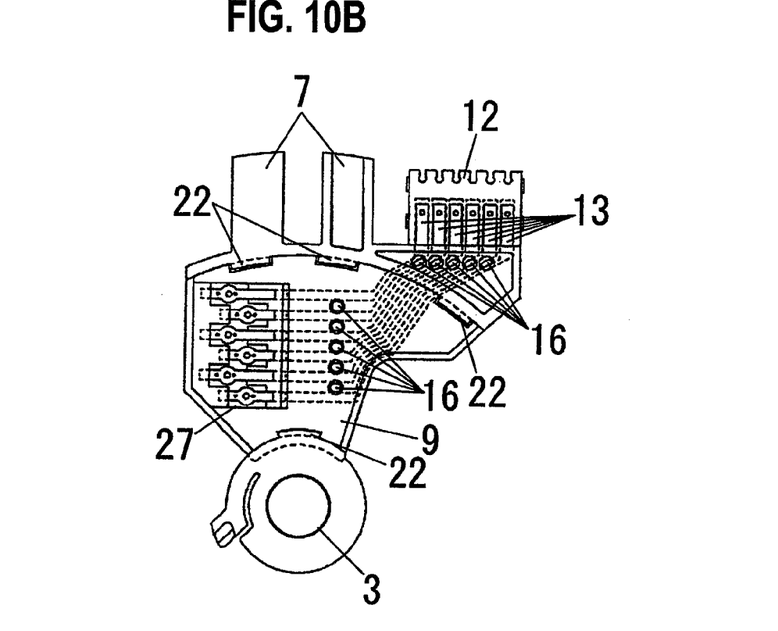
FIG. 10B is a rear view of the fixed member according to the second embodiment.
Figure 11A:
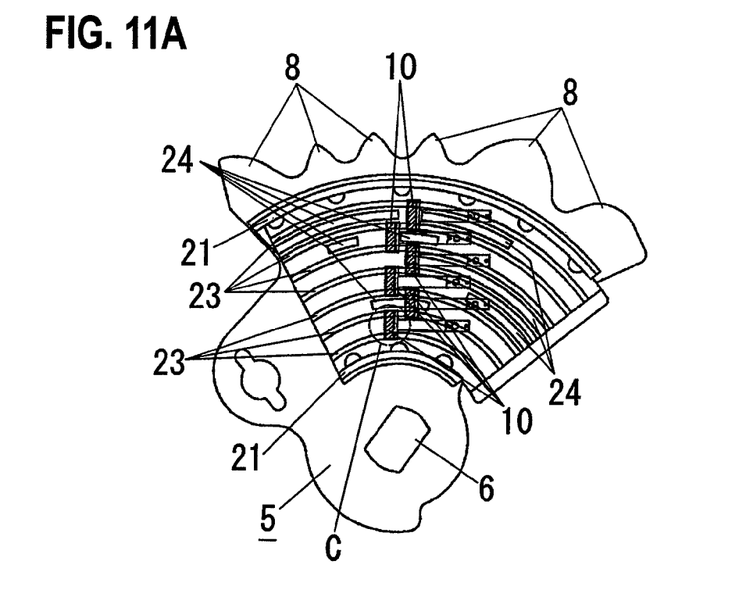
FIG. 11A is a front view showing a contacting state between a movable-side contact and a fixed-side contact of the second embodiment.
Figure 11B:
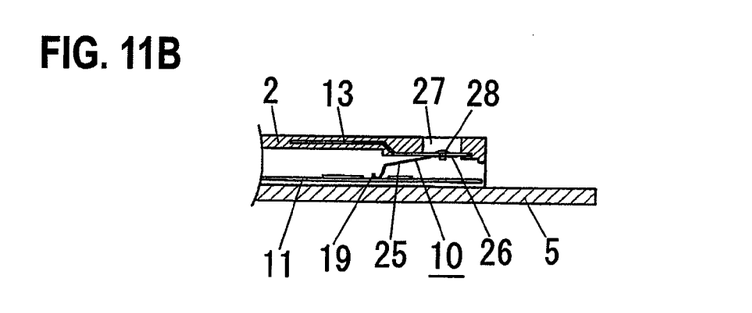
FIG. 11B is a bottom view showing relevant parts in the contacting state between a movable-side contact and a fixed-side contact of the second embodiment.
Figure 11C:
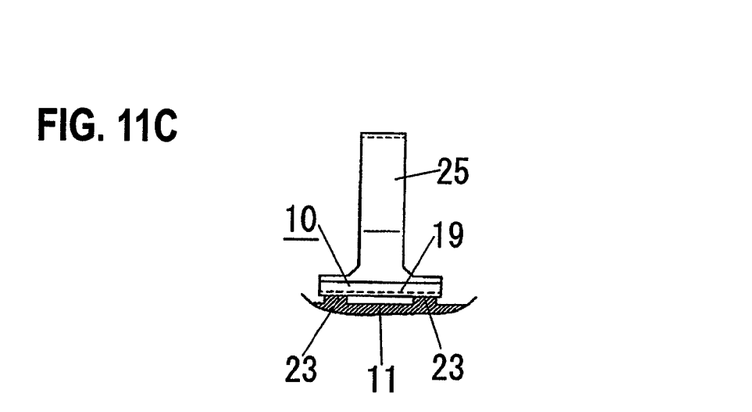
FIG. 11C is a sectional view of a portion C in FIG. 11A.

As shown in FIGS. 9A, 9B, and 9C, the leaf spring 25 is formed into a band shape. The contact 19 is continuously and integrally formed on one end of the leaf spring 25 in its longitudinal direction, and a fixing piece 26 to be mounted on the fixed member 2 is formed on the other end of the leaf spring 25 in the longitudinal direction. As shown in FIGS. 10A and 10B, in the fixed member 2, a frame hole 27 is formed in a bottom wall of the recess 18 from which a portion of the lead frame 13 is exposed. As shown in FIGS. 11A, 11B, and 11C, the fixing piece 26 and the lead frame 13 are swaged and coupled by a rivet 28 in a state where the fixing piece 26 is fixed to the lead frame 13 is super posed in the frame hole 27. With this structure, the leaf spring 25 is mounted on the fixed member 2 and electrically connected to the lead frame 13. The leaf spring 25 is extended toward the connector 12 along the lead frame 13 such that as the leaf spring 25 is separated from the fixing piece 26, the leaf spring 25 approaches the movable-side contact 11. The contact 19 is curved into J-shape projecting toward the movable-side contact 11. The width of the contact 19 is wider than the leaf spring 25 in the width direction of the leaf spring 25.

Also in the second embodiment, any of the movable-side contact 11 having no contact rib 23 as shown in FIGS. 8A and 8B and the movable-side contact 11 provided with the contact ribs 23 as shown in FIGS. 11A, 11B, and 11C can be employed. The effects obtained when any of the movable-side contacts 11 are employed are the same as that explained in the first embodiment.

Third Embodiment

Figure 12:
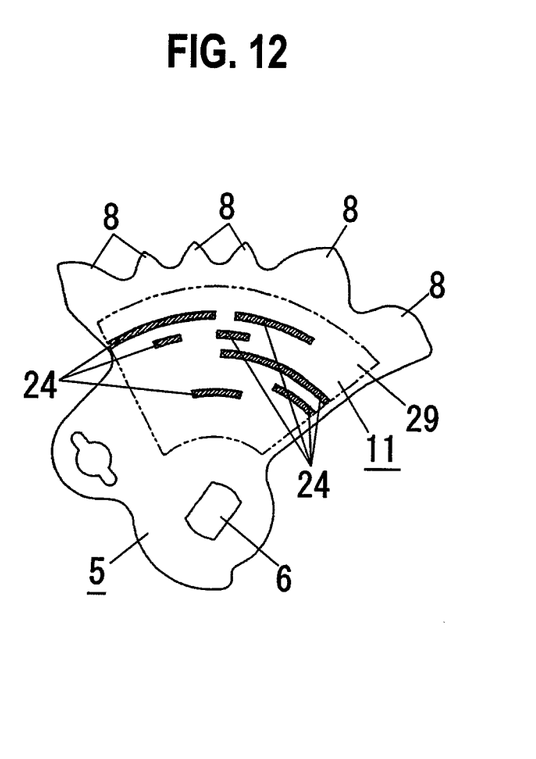
FIG. 12 is a front view showing a movable member according to a third embodiment of the present invention.

An automatic transmission switch 1 of a third embodiment of the present invention is not the same as the automatic transmission switch 1 of the first embodiment in that the movable-side contact 11 is integrally formed on the movable member 5 as shown in FIG. 12. Other structures and functions are the same as those of the first embodiment.

Specifically, in the third embodiment, the conductive plate fixed to the movable member 5 is omitted. As shown in FIG. 12, a plated layer 29 is formed on a surface of the movable member 5 which is opposed to the recess 9 of the fixed member 2. The plated layer 29 is formed with the movable-side contact 11. The plated layer 29 is formed by plating the surface of the movable member 5 opposed to the recess 9 of the fixed member 2 with high conductive material. The insulation ribs 24 are formed simultaneously when the plated layer 29 is formed.

In the third embodiment, the movable-side contact 11 is formed directly on the movable member 5. Since the movable-side contact 11 and the movable member 5 are integrally formed as one part, the number of parts of the automatic transmission switch 1 can be reduced as compared with a case that the conductive plate which is an independent member from the movable member 5 is formed as the movable-side contact 11. Therefore, the assembling operation of the automatic transmission switch 1 can be simplified.

The structure in which the movable-side contact 22 and the movable member 5 are integrally formed as one part is not limited to the structure in which the plated layer 29 is formed as described above, and the movable member 5 itself may be made of conductive material, and a contact portion of the movable member 5 with respect to the fixed-side contact 10 may be the movable-side contact 11.

According to the present invention, the movable-side contact is fixed to the movable member, and the fixed member is provided with the spring member which biases the fixed-side contact toward the movable-side contact. Therefore, even if vibration of the automatic transmission is transmitted to the movable member in a state where the movable-side contact and the fixed-side contact are in contact with each other, the movable-side contact vibrates together with the fixed-side contact, and a possibility that the movable-side contact is separated from the fixed-side contact is low. Therefore, a contact failure by bounce of the movable-side contact is less prone to be generated as compared with the conventional structure inn which vibration of the automatic transmission is propagated to the movable-side contact through the spring member.

While the embodiment of the present invention has been described above, the invention is not limited to the above embodiments and changes and modifications can be made within the scope of the gist of the present invention.

What is claimed is:

1. An automatic transmission switch comprising
a fixed member fixed to a vehicle body of an automobile,
a fixed-side contact provided on one surface of the fixed member,
a movable member which is opposed to the one surface of the fixed member and which is supported by the fixed member such that the movable member can turn around a turning axis perpendicular to the one surface,
and a movable-side contact provided on a surface of the movable member opposed to the fixed member,
in which one of the fixed-side contact and the movable-side contact has an intermittent contact portion with respect to the other along a moving direction of the movable member, and the movable member is connected to an automatic transmission and turned according to a switching operation of a shift bar so that the movable member brings the fixed-side contact and the movable-side contact into contact with each other and separates the fixed-side contact and the movable-side contact from each other, wherein
the movable-side contact is fixed to the movable member,
the fixed member is provided with a spring member which biases the fixed-side contact toward the movable-side contact,
the spring member is a leaf spring,
the fixed-side contact has a contact which comes into contact with the movable side contact,
the leaf spring is interposed between the contact and the fixed member,
a portion of the movable member which comes into contact with the contact of the fixed-side contact is provided with an insulation rib made of insulation material,
the insulation rib has a width smaller than that of the contact of the fixed-side contact and intermittently projects along the moving direction of the movable member,
a pair of contact ribs being conductive and lower than the insulation rib projects from the movable side contact at a region thereof which comes into contact with the contact of the fixed-side contact and which is on both sides in a width direction of the insulation rib, the contact simultaneously comes into contact with the pair of contact ribs when coming into contact with the pair of contact ribs, and the insulation rib is positioned between the pair of contact ribs.

2. The automatic transmission switch according to claim 1, wherein the movable-side contact and the movable member are integrally formed as one part.

3. The automatic transmission switch according to claim 1, wherein a contact surface of the movable-side contact with respect to the fixed-side contact is a flat surface.

* * * * *